(12) United States Patent
Fan et al.

(10) Patent No.: US 12,282,003 B1
(45) Date of Patent: Apr. 22, 2025

(54) METHOD FOR CALIBRATING SOUND VELOCITY APPLIED TO MULTI-LAYER VARIABLE THICKNESS STRUCTURE

(71) Applicant: HEFEI GENERAL MACHINERY RESEARCH INSTITUTE CO., LTD., Anhui (CN)

(72) Inventors: Zhichao Fan, Hefei (CN); Jingwei Cheng, Hefei (CN); Xiangting Xu, Hefei (CN); Yangguang Bu, Hefei (CN)

(73) Assignee: HEFEI GENERAL MACHINERY RESEARCH INSTITUTE CO., LTD., Hefei (CN)

( * ) Notice: Subject to any disclaimer, the term of this patent is extended or adjusted under 35 U.S.C. 154(b) by 0 days.

(21) Appl. No.: 18/951,585

(22) Filed: Nov. 18, 2024

Related U.S. Application Data

(63) Continuation of application No. PCT/CN2024/091372, filed on May 7, 2024.

(30) Foreign Application Priority Data

Dec. 21, 2023 (CN) .......................... 202311765200.1

(51) Int. Cl.
*G01N 29/30* (2006.01)
*G01N 29/07* (2006.01)

(52) U.S. Cl.
CPC .............. *G01N 29/30* (2013.01); *G01N 29/07* (2013.01); *G01N 2291/011* (2013.01); *G01N 2291/0231* (2013.01); *G01N 2291/106* (2013.01)

(58) Field of Classification Search
CPC .. G01N 29/30; G01N 29/07; G01N 2291/011; G01N 2291/0231; G01N 2291/106
(Continued)

(56) References Cited

U.S. PATENT DOCUMENTS

| 2017/0030863 A1* | 2/2017 | Holmes | G01N 29/2468 |
| 2023/0251228 A1 | 8/2023 | Jack et al. | |

FOREIGN PATENT DOCUMENTS

| CN | 101710105 A | 5/2010 |
| CN | 102128672 A | 7/2011 |

(Continued)

OTHER PUBLICATIONS

First Office Action in Chinese Application No. 202311765200.1 mailed on Feb. 4, 2024, 16 pages.

(Continued)

*Primary Examiner* — Jonathan M Dunlap
*Assistant Examiner* — John M Royston
(74) *Attorney, Agent, or Firm* — Porus IP LLC

(57) ABSTRACT

Embodiments of the present disclosure provide a method for calibrating a sound velocity applied to a multi-layer variable thickness structure, comprising: constructing a planar multi-layer medium stacked structure and determining a sound velocity of each layer of medium material in the planar multi-layer medium stacked structure; establishing a curved multi-layer medium stacked structure, the curved multi-layer medium stacked structure being arranged with a plurality of discrete elements; at the same time, establishing a fluctuation equation for determining a sound pressure value of each of the plurality of discrete elements; establishing a loss function between the sound pressure value of each discrete element calculated by the fluctuation equation and a measured sound pressure value of each discrete element; performing a gradient descent calculation on the sound pressure value of each discrete element based on the loss function, iteratively updating to obtain a sound velocity value being used as a weighting parameter in the plurality of discrete elements until a minimum value of the loss function (Continued)

is obtained, wherein the sound velocity value is an optimal speed value.

5 Claims, 4 Drawing Sheets

(58) Field of Classification Search
USPC .......................................................... 73/1.86
See application file for complete search history.

(56) References Cited

FOREIGN PATENT DOCUMENTS

| | | |
|---|---|---|
| CN | 110308204 A | 10/2019 |
| CN | 113092589 A | 7/2021 |
| CN | 115656317 A | 1/2023 |
| KR | 101396875 B1 | 5/2014 |

OTHER PUBLICATIONS

Notification to Grant Patent Right for Invention in Chinese Application No. 202311765200.1 mailed on Feb. 28, 2024, 6 pages.

\* cited by examiner

```
┌─────────────────────────────────────────────┐
│ Constructing a planar multi-layer medium    │
│ stacked structure and determining a sound   │
│ velocity of each layer of medium material   │
│ in the planar multi-layer medium stacked    │
│ structure                                   │
└─────────────────────────────────────────────┘
                     │
                     ▼
┌─────────────────────────────────────────────┐
│ Establishing a curved multi-layer medium    │
│ stacked structure, the curved multi-layer   │
│ medium stacked structure being arranged     │
│ with a plurality of discrete elements;      │
│ establishing a fluctuation equation for     │
│ determining a sound pressure value of each  │
│ of the plurality of discrete elements       │
└─────────────────────────────────────────────┘
                     │
                     ▼
┌─────────────────────────────────────────────┐
│ Establishing a loss function between the    │
│ sound pressure value and a measured sound   │
│ pressure value of the plurality of discrete │
│ elements                                    │
└─────────────────────────────────────────────┘
                     │
                     ▼
┌─────────────────────────────────────────────┐
│ Performing a gradient descent calculation   │
│ on the sound pressure value based on the    │
│ loss function, iteratively updating to      │
│ obtain a sound velocity value being used as │
│ as a weighting parameter in the plurality   │
│ of discrete elements until a minimum value  │
│ of the loss function is obtained, wherein   │
│ the sound velocity value is an optimal      │
│ speed value                                 │
└─────────────────────────────────────────────┘
```

FIG. 1

METHOD FOR CALIBRATING SOUND VELOCITY APPLIED TO MULTI-LAYER VARIABLE THICKNESS STRUCTURE

CROSS-REFERENCE TO RELATED APPLICATIONS

This application is a Continuation of International Application No. PCT/CN2024/091372, filed on May 7, 2024, which claims priority to Chinese application No. 202311765200.1, filed on Dec. 21, 2023, the entire contents of which are hereby incorporated by reference.

TECHNICAL FIELD

The present disclosure relates to a technical field of sound velocity calibration, and in particular, relates to a method for calibrating a sound velocity applied to a multi-layer variable thickness structure.

BACKGROUND

Acoustic properties of material refer to a response to and effect of the material on sound waves. In an acoustics field, the study of the acoustic properties of the material, especially a sound velocity, is important for understanding the propagation and control of the sound. The sound velocity refers to a speed at which the sound waves propagate through the material, and the sound velocity is primarily affected by physical properties such as density, modulus of elasticity, and viscosity of the material. By studying the sound velocity in different materials, better solutions for practical applications in various fields may be provided. For example, in construction engineering, materials with relatively low sound velocity may be used for designing noise barriers and anti-noise equipment.

Currently, measurement of the sound velocity of the material is generally performed based on a ultrasonic pulse bottom echo process, that is, for a material with a determined thickness, when the ultrasonic pulse emitted by the ultrasonic probe reaches a bottom surface of the material, the ultrasonic pulse may be reflected back to the probe due to a difference of acoustic impedance. The sound velocity of the material may be calculated by measuring a time of the bottom echo reaching the probe.

For a single-layer planar structure, the process has a relatively high measurement accuracy. However, for actual production equipment including various pipelines and pressure vessels, which are often curved structures, the conditions such as scaling and the presence of residual material residue may occur during the use, resulting in multi-layers variable thickness. Change of the sound velocity in each layer of the material is not known in advance during a process of applying the ultrasonic pulse bottom echo process, relevant parameters are usually estimated through work experience, and then curved surface structures are merged, which makes the application of the ultrasonic pulse bottom echo process in a boundary calibration of a multi-layer variable thickness structure restricted, and makes the measurement accuracy of the sound velocity low.

Therefore, there is a need to provide a method for calibrating a sound velocity applied to a multi-layer variable thickness structure, which may help to realize a fine calibration of sound velocity boundary of multi-layer variable thickness materials.

SUMMARY

One of the embodiments of the present disclosure provides a method for calibrating a sound velocity applied to a multi-layer variable thickness structure. The method includes following operations:

S1, constructing a planar multi-layer medium stacked structure and determining a sound velocity of each layer of medium material in the planar multi-layer medium stacked structure;

S2, establishing a curved multi-layer medium stacked structure, the curved multi-layer medium stacked structure being arranged with a plurality of discrete elements; establishing a fluctuation equation for determining a sound pressure value of each of the plurality of discrete elements;

S3, establishing a loss function between the sound pressure value and a measured sound pressure value of the plurality of discrete elements; and S4, performing a gradient descent calculation on the sound pressure value based on the loss function, iteratively updating to obtain a sound velocity value being used as a weighting parameter in the plurality of discrete elements until a minimum value of the loss function is obtained, wherein the sound velocity value is an optimal speed value.

S1 further includes the following operations:

S11, constructing the planar multi-layer medium stacked structure, selecting n types of medium materials, the medium materials being arranged in stacked layers sequentially from top to bottom along a vertical direction, and a contact surfaces between two adjacent layers of medium materials constituting a horizontal reflective plane;

S12, irradiating the planar multi-layer medium stacked structure by using an ultrasound emitter with array elements arranged sequentially and equidistantly along a straight line, the irradiation process including:

S121, selecting a planar multi-layer medium stacked structure in a cuboid shape, establishing a space rectangular coordinate system O-XYZ by designating a thickness direction of the planar multi-layer medium stacked structure, i.e., a direction in which the plurality of medium materials are arranged in stacked layers sequentially from the top to bottom along the vertical direction, as a positive direction of a Z-axis, designating a width direction of the planar multi-layer medium stacked structure as a positive direction of a Y-axis, and designating a length direction of the planar multi-layer medium stacked structure as a positive direction of an X-axis; wherein a top surface of the planar multi-layer medium stacked structure coincides with an XY surface, and a corner of the top surface coincides with a coordinate origin O;

S122, arranging the array elements on the ultrasound emitter sequentially and equidistantly along a straight line; moving the ultrasound emitter along the positive direction of the Y-axis to vertically irradiate the reflective plane and form a moving trajectory, and an arrangement direction of the array elements being parallel to the positive direction of the X-axis during the movement of the ultrasound emitter;

S123, repeatedly moving the ultrasound emitter along the positive direction of the Y-axis multiple times to form a moving trajectory corresponding to each of a plurality of lanes, the plurality of lanes being parallel to each other along the position direction of the Y-axis, and a distance between adjacent moving trajectories being equal to a distance between adjacent array elements; wherein a sound velocity of an ultrasonic wave emitted by the ultrasound emitter propagation in a kth layer of medium material is $c_k$, and a thickness of the kth layer of medium material is $d_k$, and based on the sound velocity of the ultrasonic wave and the thickness of medium material, a corresponding time is calculated based on a time calculation equation, the time calculation equation is:

$$t_{i,j,k}^2 = \frac{(x_{i,r} - x_{j,r})^2}{\widetilde{c}_k^2} + t_{i,i,k}^2$$

wherein $t_{i,j,k}$ denotes a time taken for the ultrasonic wave emitted by an ith array element to propagate to the kth layer of medium material and to be received by a jth array element after being reflected in a reflective plane of the kth layer of medium material; $t_{i,j,k}$ denotes a time taken for the ultrasonic wave emitted by the ith array element to propagates to the kth layer of medium material and to be received by the ith array element after being reflected in the reflective plane of the kth layer of medium material; $\widetilde{c}_k$ denotes a root-mean-square of a sound velocity from a first layer of medium material to the kth layer of medium material; $x_{i,r}$ denotes a positional coordinate of the ith array element in a rth moving trajectory on the X-axis; $x_{j,r}$ denotes a positional coordinate of the jth array element in the rth moving trajectory on the X-axis;

S13, calculating $\widetilde{c}_n$ based on $\widetilde{c}_k$ with following equation:

$$\widetilde{c}_n = \sqrt{\frac{\sum_{k=1}^{n} c_k^2 t_k}{\sum_{k=1}^{n} t_k}};$$

$$t_k = \frac{t_{i,i,k} - t_{i,i,k-1}}{2};$$

$$\sum_{k=1}^{n} c_k^2 t_k = \widetilde{c}_n^2 \sum_{k=1}^{n} t_k$$

wherein $t_k$ denotes single-trip time of vertical propagation of the ultrasonic wave in the kth layer of the medium material; $c_k$ denotes the sound velocity from the first layer of the medium material to the kth layer of the medium material; $c_n$ denotes the root-mean-square of a sound velocity from the first layer of the medium material to an nth layer of the medium material; $t_{i,j,k-1}$ denotes a time taken for the ultrasonic wave emitted by the ith array element to propagate to a k−1th layer of the medium material and to be received by the ith array element after being reflected in the reflective plane of the kth layer of the medium material;

S14, an n−1th layer of the medium material satisfying a following equation:

$$\sum_{k=1}^{n-1} c_k^2 t_k = \widetilde{c}_{n-1}^2 \sum_{k=1}^{n-1} t_k$$

wherein $\widetilde{c}_{n-1}$ denotes a root-mean-square of a sound velocity from the first layer of the medium material to the n−1th layer of the medium material;

S15, obtaining a sound velocity expression equation of $c_n$ by the equation in S13 and the equation in S14, wherein the sound velocity expression equation is:

$$c_n^2 = \frac{\widetilde{c}_n^2 t_{i,i,n} - \widetilde{c}_{n-1}^2 t_{i,i,n-1}}{t_{i,i,k} - t_{i,i,k-1}}$$

wherein $t_{i,i,n-1}$ denotes a time used for the ultrasonic wave emitted by the ith array element to propagate to the n−1th layer of the medium material and to be received by the ith array element after being reflected in a reflective plane of the n−1th layer of the medium material; $t_{i,i,n}$ denotes a time used for the ultrasonic wave emitted by the ith array element to propagate to a nth layer of medium material and to be received by the ith array element after being reflected in a reflective plane of the nth layer of the medium material; wherein values of $\widetilde{c}_n$, $t_{i,i,n}$, $\widetilde{c}_{n-1}$, $t_{i,i,n-1}$, $t_{i,j,k}$, and $t_{i,j,k-1}$ are measured by corresponding measuring instruments, and by substituting the values into the sound velocity expression equation, a sound velocity of the ultrasonic wave propagating in the medium material is obtained.

BRIEF DESCRIPTION OF THE DRAWINGS

The present disclosure is further describable in terms of exemplary embodiments. These exemplary embodiments are describable in detail with reference to the drawings. These embodiments are non-limiting exemplary embodiments, in which like reference numerals represent similar structures throughout the several views of the drawings, and wherein:

FIG. 1 is an exemplary flowchart illustrating a process for calibrating a sound velocity applied to a multi-layer variable thickness structure according to some embodiments of the present disclosure;

DETAILED DESCRIPTION

Figure 2:
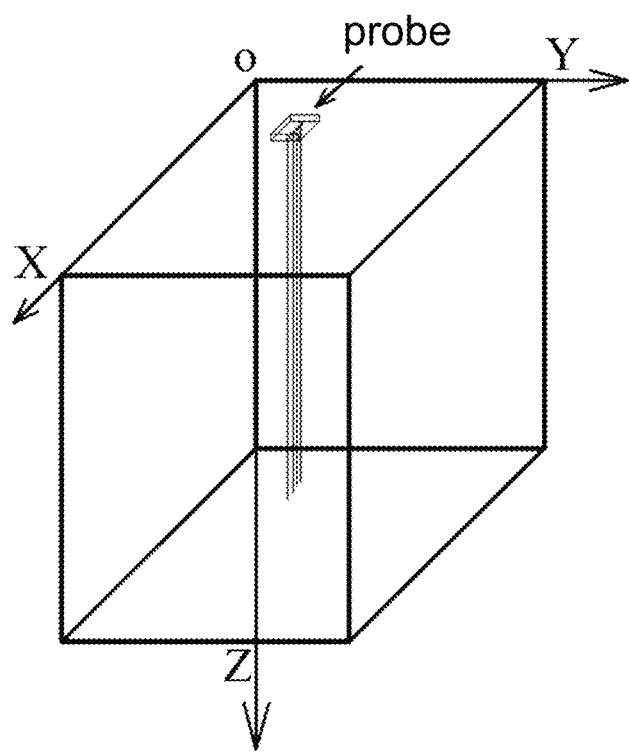
FIG. 2 is a schematic diagram illustrating an actual velocity model according to some embodiments of the present disclosure.

In order to more clearly illustrate the technical solutions of the embodiments of the present disclosure, the following will briefly introduce the drawings that need to be used in the description of the embodiments. It will be apparent that the drawings in the following description are only some examples or embodiments of the present disclosure, and that the present disclosure may be applied to other similar scenarios according to these drawings without creative labor for those of ordinary skill in the art. Unless obviously obtained from the context or the context illustrates otherwise, the same numeral in the drawings refers to the same structure or operation.

It should be understood that the terms "system," "device" as used herein, "unit," and/or "module" as used herein is a way to distinguish between different components, elements, parts, sections, or assemblies at different levels. However, the words may be replaced by other expressions if other words accomplish the same purpose.

As shown in the present disclosure and in the claims, unless the context clearly suggests an exception, the words "a," "one," and/or "the" do not refer specifically to the singular, but may also include the plural. In general, the terms "including" and "comprising" suggest only the inclusion of clearly identified steps and elements, which do not constitute an exclusive list, and the method or apparatus may also include other steps or elements.

The flowcharts are used in the present disclosure to illustrate operations performed by a system according to embodiments of the present disclosure. It should be appreciated that the preceding or following operations are not necessarily performed in an exact sequence. Instead, operations can be processed in reverse order or simultaneously. Also, it is possible to add other operations to the process, or to remove a step or steps from these processes.

FIG. 1 is an exemplary flowchart illustrating a process for calibrating a sound velocity applied to a multi-layer variable thickness structure according to some embodiments of the present disclosure, executed by a processor, including the following operations:

In S1, a planar multi-layer medium stacked structure may be constructed and a sound velocity of each layer of medium material in the planar multi-layer medium stacked structure may be determined.

The planar multi-layer medium stacked structure is a structure formed by stacking a plurality of medium materials, wherein a contact surface of each layer of medium material is planar. In some embodiments, the processor may randomly select a plurality of different medium materials to be arranged in stacked layers sequentially from top to bottom along a vertical direction, and a contact surface between two adjacent layers of medium materials is a plane to construct the planar multi-layer medium stacked structure. The medium materials refer to materials of different medium in the planar multi-layer medium stacked structure, such as a steel material, an iron material, a glass material, or the like.

In some embodiments, S1 may include operations S11-S15 as follows.

In S11, the planar multi-layer medium stacked structure may be constructed, n types of medium materials may be selected, wherein the medium materials are arranged in stacked layers sequentially from top to bottom along a vertical direction, and a contact surface between two adjacent layers of the medium materials constituting a horizontal reflective plane. The value of n may be preset by a system or by a human being, e.g., n may be an integer number of 2 or more. The horizontal reflective plane is a contact plane between two adjacent layers of medium materials that may reflect an ultrasound wave.

In S12, the planar multi-layer medium stacked structure may be irradiated by using an ultrasound emitter with array elements sequentially and equidistantly along a straight line.

The ultrasound emitter is an instrument that may emit and receive an ultrasound wave, and the array element is a smallest unit in the ultrasound emitter that may independently emit and receive the ultrasound wave.

In some embodiments, the ultrasound emitter may have a plurality of array elements arranged sequentially along a linear array direction, the array elements may be arranged equidistantly or may be arranged at variable distances, and the present disclosure focuses on verifying the array elements arranged equidistantly.

In some embodiments, the irradiation process may include following operations S121-S123:

In S121, a planar multi-layer medium stacked structure in a cuboid shape may be selected, a space rectangular coordinate system O-XYZ is established by designating a thickness direction of the planar multi-layer medium stacked structure, i.e., a direction in which the plurality of medium materials are arranged in stacked layers sequentially from the top to bottom along the vertical direction, as a positive direction of a Z-axis, designating a width direction of the planar multi-layer medium stacked structure as a positive direction of a Y-axis, designating a length direction of the planar multi-layer medium stacked structure as a positive direction of an X-axis. A top surface of the planar multi-layer medium stacked structure coincides with an XY surface, and a corner of the top surface coincides with a coordinate origin O.

For a homogeneous medium material, the ultrasound emitter may be used to irradiate it. The homogeneous medium material is a medium material with a same density. Each array element emits a cylindrical ultrasonic wave, and the present disclosure only considers a case of the ultrasonic wave located within a vertical plane; the ultrasonic wave in other directions or within other interfaces is not included in the calculations of the present disclosure.

In a process of constructing the homogeneous medium material, a structure in a cuboid shape is selected and a space rectangular coordinate system is established along the length direction, the width direction, and the thickness direction of the structure in the cuboid shape. As shown in FIG. 2, a space rectangular coordinate system O-XYZ is established by designating a thickness direction of the homogeneous medium material, i.e., a vertical direction of the homogeneous medium material arranged in stacked layers sequentially from top to bottom as a positive direction of a Z-axis, designating a width direction of the homogeneous medium material as a positive direction of a Y-axis, and designating a length direction of the homogeneous medium material as a positive direction of an X-axis; a top surface of the homogeneous medium material structure coincides with an XY surface, and a corner of the top surface coincides with a coordinate origin O.

In S122, the array elements are arranged on the ultrasound emitter sequentially and equidistantly along a straight line; the ultrasound emitter is moved along the positive direction of the Y-axis to vertically irradiate the reflective plane and form a moving trajectory, and an arrangement direction of the array elements is parallel to the positive direction of the X-axis during the movement of the ultrasound emitter.

In S123, the ultrasound emitter may be repeatedly moved along the positive direction of the Y-axis multiple times to form a moving trajectory corresponding to each of a plurality of lanes, the plurality of lanes are parallel to each other along the positive direction of the Y-axis, and a distance between adjacent moving trajectories is equal to a distance between adjacent array elements.

As shown in FIG. 2, the array elements are mounted in a probe of the ultrasound emitter, and the array elements are arranged sequentially along the X-axis direction. In some embodiments, there may be multiple rows of array elements, and the array elements in the probe may be arranged as a rectangular array. The probe may be moved in the Y-axis direction to form a moving trajectory, and each moving trajectory includes a corresponding number of sweep trajectories. By repeatedly moving the ultrasound emitter along the Y-axis direction, multiple moving trajectories may be generated, and a total of R moving trajectories may be formed. The moving trajectories are arranged uniformly and sequentially along the X-axis direction in sequence, and the distance between adjacent moving trajectories is equal to the distance between adjacent array elements. In some embodiments of the present disclosure, a distance design may make it possible for the array elements arranged along the X-axis direction to form adjacent sweep trajectories in the X-axis direction at the same distance from each other, which helps to improve the uniformity of the sweep.

In some embodiments, the processor may determine, based on material data of the medium materials, a first complexity, and a detecting depth, a detecting parameter of the ultrasound emitter through a parametric determining model; and based on the detecting parameter, irradiate the planar multi-layer medium stacked structure by using the ultrasound emitter with array elements arranged sequentially and equidistantly along the straight line.

The material data is data related to material of the medium materials. For example, the material data may include hardness, density of the medium materials, or the like. In some embodiments, the processor may determine the material data of the medium material by means of a densitometer, a hardness tester, or the like.

The first complexity refers to the count of types of the medium materials in the planar multi-layer medium stacked structure, i.e., the count of layers of the planar multi-layer medium stacked structure. In some embodiments, the processor may determine the value of n as the first complexity.

The detecting depth is a thickness of the planar multi-layer medium stacked structure. In some embodiments, the processor may determine a coordinate of the Z-axis of the bottom surface of the bottom layer of the planar multi-layer medium stacked structure in the O-XYZ as the detecting depth.

The parametric determining model refers to a model for determining the detecting parameter. In some embodiments, the parametric determining model may be a machine learning model, such as a deep neural network, or the like.

The detecting parameter is a parameter associated with the ultrasound emitter for performing the detection. In some embodiments, the detecting parameter may include a number of array elements, a probe frequency, and a sampling frequency.

The number of array elements is a number of array elements of the ultrasound emitter. For example, the number of array elements may be an exponent of 2 such as 16, 32, 64, or the like. The probe frequency is a frequency at which the probe of the ultrasound emitter emit an ultrasonic wave. The sampling frequency is a frequency at which the ultrasound emitter samples.

In some embodiments, the parametric determining model may include a first generation layer, a second generation layer, a third generation layer, and a parameter evaluating layer.

The first generation layer is a layer used to generate a candidate probe frequency. The first generation layer may be a deep neural network model. The candidate probe frequency is a probe frequency that is a candidate for the detecting parameter.

In some embodiments, inputs of the first generation layer may include material data, the first complexity, and the detecting depth of the medium materials. Output of the first generation layer may be the candidate probe frequency.

In some embodiments, the input of the first generation layer may also include a thickness of the medium material.

In some embodiments, the processor may determine an average thickness of medium material as a thickness of the layer of medium material.

The thickness of medium material has a requirement on the probe frequency. For example, the thicker the medium material is, the lower the probe frequency is in order to allow the ultrasonic wave to better penetrate the medium material. In some embodiments of the present disclosure, by using the thickness of the medium material as an input of the first generation layer, the thickness of medium material may affect the generation of the candidate probe frequency, improving the accuracy and utility of determination of the candidate probe frequency.

In some embodiments, the first generation layer may be obtained based on first training samples and first labels training in a training data set. For example, a plurality of first training samples with the first labels are input into an initial first generation layer, a loss function is constructed based on the first labels and the output of the initial first generation layer, and parameters of the initial first generation layer are iteratively updated based on the loss function by gradient descent or other processes until the training is completed when a preset condition is satisfied, and the first generation layer is obtained. The preset condition may be that the loss function converges, the number of iterations reaches a threshold, or the like.

Each set of training samples of the first training samples may include sample material data, a sample first complexity, and a sample detecting depth from multiple historical detections. When the thickness of medium material is used as an input to the first generation layer, the each set of training samples of the first training samples may also include the thickness of the sample medium material from multiple historical detections. The first training samples may be obtained based on historical data.

The first labels may include a plurality of candidate probe frequencies corresponding to the first training samples. In some embodiments, the processor may cluster the first training samples, and for each class obtained from the clustering, the probe frequency with the highest signal-to-noise ratio of reflected signals in the historical data corresponding to the plurality of training samples is used as a first label corresponding to all the first training samples in the class.

The second generation layer is a layer used to generate a count of candidate array elements. The second generation layer may be a deep neural network model. The count of candidate array elements is a count of candidate array elements for the detecting parameter.

In some embodiments, inputs of the second generation layer may include material data, a first complexity, and a detecting depth of the medium material. Output of the second generation layer may be the count of candidate array elements.

In some embodiments, the inputs of the second generation layer may include a surface roughness of the medium material.

The surface roughness is a roughness degree of a surface of the medium material. In some embodiments, a technician may measure the roughness degree of the surface of the medium material by means of a stylus-type roughness meter or the like, and determine an average value of the surface roughness of the medium material as the roughness degree of the surface of the medium material.

The roughness degree of the surface of the medium material may affect the propagation of the ultrasonic wave among different surfaces. The higher the surface roughness, the more times the ultrasonic wave is reflected, refracted, and scattered during the propagation process, the more the number of array elements need to be increased in order to improve an accuracy and reliability of the measurement. In some embodiments of the present disclosure, a reliability of outputting the count of the candidate array elements can be improved by using the v of the medium material as an input to the second generation layer.

In some embodiments, the second generation layer may be obtained based on the second training samples and the second labels training in the training data set. The second generation layer is trained in a same manner as the first generation layer, and may be referred to in the preceding relevant description.

Each set of training samples of the second training samples may include sample material data, the sample first complexity, and the sample detecting depth from multiple historical detections. When the roughness degree of the surface of the medium material is used as an input to the second generation layer, the each set of training samples of the second training samples may also include a sample surface roughness of the sample medium material from multiple historical detections. The second training samples may be obtained based on historical data.

The second labels may include a plurality of numbers of the candidate array elements corresponding to the second training samples. In some embodiments, the processor may cluster the second training samples, and for each class obtained from the clustering, the number of array elements with the greatest material coverage in the historical data corresponding to the plurality of training samples is used as a second label corresponding to all the second training samples in the class. The processor may determine the number of array elements corresponding to the ultrasound emitter that received the most reflected signals as the number of array elements with the greatest material coverage.

The third generation layer is a layer used to generate a candidate sampling frequency. The third generation layer may be a deep neural network model. The candidate sampling frequency is a sampling frequency that is candidate for the detecting parameter.

In some embodiments, inputs of the third generation layer may include material data, the first complexity, and the detecting depth of the medium material. The output of the third generation layer may be the candidate sampling frequency.

In some embodiments, the third generation layer may be obtained based on third training samples and third labels training in the training data set. The third generation layer is trained in the same manner as the first generation layer, and may be referred to in the preceding relevant description.

Each set of training samples of the third training samples may include sample material data, the sample first complexity, and the sample detecting depth from multiple historical detections. The third training samples may be obtained based on historical data.

The third labels may include a plurality of candidate sampling frequencies corresponding to the third training samples. In some embodiments, the processor may cluster the third training samples, and for each class obtained from the clustering, the sampling frequency corresponding to the highest number of feature points in the reflected signal waveform obtained by the plurality of array elements in the historical data corresponding to the plurality of training samples is used as a third label corresponding to all third training samples in the class. The feature points are points with unique local features in the reflected signal waveform, such as incident points, reflection points, or the like.

The parametric evaluating layer is a layer used to generate an optimal detecting parameter. The parametric evaluating layer may be a deep neural network model.

In some embodiments, inputs of the parametric evaluating layer may include material data, the first complexity, the detecting depth, the candidate probe frequency, the number of candidate array elements, and the candidate sampling frequency of the medium material. An output of the parametric evaluating layer may be an optimal detecting parameter. The optimal detecting parameter is a detecting parameter taken during the actual irradiation of the ultrasound emitter.

In some embodiments, the inputs of the parametric evaluating layer may also include an absorption coefficient of the medium material for the candidate probe frequency.

The absorption coefficient refers to a proportion of incident acoustic energy absorbed by the surface of the medium material. In some embodiments, the processor may determine the absorption coefficient of the medium material for the candidate probe frequency based on a standing wave tube process, a reverberation chamber process, or the like.

The higher the absorption coefficient of the medium material for the candidate probe frequency, the faster the ultrasonic waves decay during propagation, so a higher sampling frequency is needed to capture details of the signal to ensure accurate sound velocity measurement. Some embodiments of the present disclosure use the absorption coefficient of the medium material for the candidate probe frequency as an input to the parametric evaluating layer, which allows for the determination of a more accurate optimal detecting parameter.

In some embodiments, the parametric evaluating layer may be obtained based on fourth training samples and fourth labels training in the training data set. The parameter evaluation layer is trained in the same manner as the first generation layer, and may be referred to in the preceding relevant description.

Each set of training samples of the fourth training samples may include sample material data, the sample first complexity, the sample detecting depth, the sample candidate probe frequency, the number of the sample candidate array elements, and the sample candidate sampling frequency from multiple historical detections. When the absorption coefficient of the medium material for the candidate probe frequency is used as an input to the parameter evaluating layer, the each set of training samples of the fourth training samples may also include the absorption coefficient of the sample medium material for the candidate probe frequency from multiple historical detections. The fourth training samples may be obtained based on historical data.

The fourth label may be an optimal detecting parameter corresponding to the fourth training samples in multiple historical detections. In some embodiments, the processor may randomly combine the candidate probe frequency, the number of candidate array elements, and the candidate sampling frequency corresponding to the fourth training samples to generate a plurality of candidate detecting parameters, and designate a candidate detecting parameter corresponding to a most effective detection as the optimal detecting parameter in the fourth labels. The most effective detection may be a detection with a lowest number of subsequent iterations and/or a lowest average value of sound pressure differences of each discrete elements in the pressure difference matrix obtained from the last iteration. Further description of the subsequent iteration and the pressure difference matrix may be found in a later relevant description.

In some embodiments, when training the parametric determining model, after each predetermined number of rounds of training, the processor may multiply a learning rate of the parametric determining model by a decay factor to obtain a new learning rate, and train the parametric determining model based on the new learning rate.

The decay factor may be a value between 0~1. The decay factor may be determined based on historical experience.

In some embodiments, the predetermined number of rounds is determined based on a standard deviation of the material data in the training data set. Exemplarily, the greater the standard deviation of the density or hardness of medium materials, the greater the predetermined number of rounds.

The greater the standard deviation of the material data, the greater the difference among detecting parameters required to detect the individual medium materials in the training data set. In some embodiments of the present disclosure, the predetermined number of rounds is determined based on the standard deviation of the material data in the training data set, and by multiplying the learning rate of the parametric determining model by the decay factor after the predetermined number of rounds of training, the decay of the learning rate may be delayed when the standard deviation of the material data is great, which can help the model to better converge to an optimal solution, and to avoid an situation of oscillation or inability to converge during the training process.

In some embodiments of the present disclosure, based on the material data, the first complexity, and the detecting depth of the medium material, the detecting parameter of the ultrasound emitter may be determined by the parametric determining model, and the ultrasound emitter may be used to irradiate the planar multi-layer medium stacked structure based on the detecting parameter, which can utilize self-learning capability of machine learning to find a pattern from a large amount of data to determine the optimal detecting parameter quickly and accurately, and improve a detecting effect of the ultrasound emitter.

In some embodiments, a propagation duration of the ultrasonic wave is calculated by utilizing the ith array element to transmit the ultrasonic wave, which begins to reflect when reaching the bottom surface of the homogeneous medium material structure, and which reflect in different directions, either directly back to the original transmitting array element, or to other array elements. The propagation duration of the ultrasonic wave emitted by the ith array element and reflected to the jth array element is as follows:

$$t_{i,j}^2 = \frac{(x_{i,r} - x_{j,r})^2 + 4d^2}{c^2} = \frac{(x_{i,r} - x_{j,r})^2}{c^2} + t_{i,i}^2 \quad (1)$$

$t_{i,j}$ denotes a time taken for the ultrasonic wave emitted by the ith array element to propagate in the homogeneous medium material and to be received by the jth array element after being reflected in a reflective plane; $t_{i,i}$ denotes a time taken for the ultrasonic wave emitted by the ith array element to propagate in the homogeneous medium material and to be received by the ith array element after being reflected in the reflective plane; the reflective plane of the homogeneous medium material is a transition surface between the homogeneous medium material and another medium material.

$x_{i,r}$ denotes a positional coordinate of the ith array element in a rth moving trajectory on the X-axis; $x_{j,r}$ denotes a positional coordinate of the jth array element in the rth moving trajectory on the X-axis. d is a distance between the reflective plane and a surface from which the array element emits an ultrasonic wave, and c is a propagation velocity of the ultrasonic wave in the medium, i.e. the sound velocity.

After determining $t_{i,j}$, different sound velocities may be used to get different times. Amplitudes of the combination with a same distant may be superimposed and taken an average of the amplitudes, and then amplitudes of different sound velocities at corresponding times of receiving array elements may be superimposed. For different $t_{i,j}$, corresponding amplitudes may be obtained, and by comparing the magnitude of the amplitudes, the sound velocity corresponding to the maximum amplitude is taken as a propagation velocity of the ultrasonic wave in the homogeneous medium material.

A planar multi-layer medium stacked structure, i.e., a stacked structure formed by using a plurality of different medium materials stacked sequentially from top to bottom; the reflective plane of each stacked layer is horizontal, and the reflective plane is perpendicular to a vertical plane in which the ultrasonic wave propagates. The ultrasonic wave propagates at different velocities in each layer because the medium material in each layer is different from that in other layers. A sound velocity of an ultrasonic wave emitted by the ultrasound emitter propagation in a kth layer of medium material is $c_k$, and a thickness of the kth layer of the medium material is $d_k$. Based on the sound velocity of the ultrasonic wave and the thickness of medium material, a corresponding time is calculated based on a time calculation equation, the time calculation equation is:

$$t_{i,j,k}^2 = \frac{(x_{i,r} - x_{j,r})^2}{\tilde{c}_k^2} + t_{i,i,k}^2; \quad (2)$$

$t_{i,j,k}$ denotes a time taken for the ultrasonic wave emitted by an ith array element to propagate to the kth layer of medium material and to be received by a jth array element after being reflected in a reflective plane of the kth layer of medium material; $t_{i,i,k}$ denotes a time taken for the ultrasonic wave emitted by the ith array element to propagates to the kth layer of medium material and to be received by the ith array element after being reflected in the reflective plane of the kth layer of medium material; $\tilde{c}_k$ denotes a root-mean-square of a sound velocity from a first layer of medium material to the kth layer of medium material; $x_{i,r}$ denotes a positional coordinate of the ith array element in a rth moving trajectory on the X-axis; $x_{j,r}$ denotes a positional coordinate of the jth array element in the rth moving trajectory on the X-axis.

In S13, $\tilde{c}_k$ may be calculated based on $\tilde{c}_n$ with following equation:

$$\tilde{c}_n = \sqrt{\frac{\sum_{k=1}^{n} c_k^2 t_k}{\sum_{k=1}^{n} t_k}} \quad (3)$$

$$t_k = \frac{t_{i,i,k} - t_{i,i,k-1}}{2} \quad (4)$$

$$\sum_{k=1}^{n} c_k^2 t_k = \tilde{c}_n^2 \sum_{k=1}^{n} t_k \quad (5)$$

$t_k$ denotes a single-trip time of vertical propagation of the ultrasonic wave in the kth layer of medium material; $c_k$ denotes a sound velocity from the first layer of medium material to the kth layer of medium material; $\tilde{c}_n$ denotes a root-mean-square of a sound velocity from the first layer of medium material to an nth layer of the medium material; $t_{i,j,k-1}$ denotes a time taken for the ultrasonic wave emitted by the ith array element to propagate to a k−1th layer of medium material and to be received by the ith array element after being reflected in the reflective plane of the kth layer of medium material.

In S14, an n−1th layer of medium material may satisfy a following equation:

$$\sum_{k=1}^{n-1} c_k^2 t_k = \widetilde{c_{n-1}}^2 \sum_{k=1}^{n-1} t_k \qquad (6)$$

$\widetilde{c_{n-1}}$ denotes a root-mean-square of a sound velocity from the first layer of medium material to the n−1 st layer of medium material.

In S15, a sound velocity expression equation of $c_n$ may be obtained by the equation in S13 and the equation in S14. The sound velocity expression equation is a equation obtained by subtracting equations (5) from (6) to relate a sound velocity in the nth layer to a corresponding root-mean-square. The sound velocity expression equation is:

$$c_n^2 = \frac{\widetilde{c_n}^2 t_{i,i,n} - \widetilde{c_{n-1}}^2 t_{i,i,n-1}}{t_{i,i,k} - t_{i,i,k-1}} \qquad (7)$$

$t_{i,i,n-1}$ denotes a time taken for the ultrasonic wave emitted by the ith array element to propagate to the n−1th layer of medium material and to be received by the ith array element after being reflected in a reflective plane of the n−1th layer of medium material; and $t_{i,i,n}$ denotes a time taken for the ultrasonic wave emitted by the ith array element to propagate to a nth layer of medium material and to be received by the ith array element after being reflected in a reflective plane of the nth layer of the medium material.

Values of $\widetilde{c_n}$, $t_{i,i,n}$, $\widetilde{c_{n-1}}$, $t_{i,i,n-1}$, $t_{i,i,k}$, and $t_{i,i,k-1}$ may be measured by corresponding measuring instruments, and by substituting the values into the sound speed velocity expression equation (7), a sound velocity of the ultrasonic wave propagating in each layer of medium material may be obtained.

In the above calculation of the sound velocity, the reflective plane is set to be a horizontal plane. In real medium material, most of propagation interfaces are curved surfaces, and the velocity calculated by equation (7) may be used as a reference, so it is necessary to calculate the sound velocity further accurately with a reference velocity.

In S2, a curved multi-layer medium stacked structure ma be established, the curved multi-layer medium stacked structure may be arranged with a plurality of discrete elements; and a fluctuation equation may be established for determining a sound pressure value of each of the plurality of discrete elements.

The curved multi-layer medium stacked structure is a structure formed by the stacking of a plurality of medium materials, and a contact surface between different layers of medium material may be curved. A discrete element is a discrete point in a curved multi-layer medium stacked structure. The processor may randomly set a plurality of discrete elements in the curved multi-layer medium stacked structure.

In some embodiments, the process of determining the sound pressure value of each of the plurality of discrete elements by using the fluctuation equation includes following operations S21-S24:

In S21, a curved multi-layer medium stacked structure may be constructed, xthe n types of medium materials may be constructed, the medium materials may be arranged in stacked layers sequentially from top to bottom along a vertical direction, and the contact surface between two adjacent layers of medium materials may constitute a curved reflective plane. The curved reflective plane is a curved contact surface between two adjacent layers of medium materials that may reflect the ultrasonic wave.

In S22, the curved multi-layer medium stacked structure may be irradiated using the ultrasound emitter according to S121-S123. The array elements, during the movement along the Y-axis, form irradiation vertical planes that are equidistant, parallel, and vertically arranged along the X-axis direction, and the irradiation vertical planes intersect with the curved reflective plane.

In S23, during the movement of the ultrasound emitter, points in a moving path at a preset interval of time may be taken. Vertical irradiation rays are formed by each point in the irradiation vertical plane intersect with the curved reflective plane to form intersection points; a combination of the intersection points separates the corresponding irradiation vertical surface into a plurality of grids, the intersection points constitute grid points of the grids, and the grid points constitute the plurality of discrete elements.

In some embodiments, the fluctuation equation under considering isotropic medium is expressed as follows:

$$A \cdot P = B$$

A denotes an operator of the fluctuation equation; P denotes a sound pressure field matrix formed by a combination of the sound pressure values of the plurality of discrete elements; B denotes a matrix of laser emitting sources; $\nabla^2$ denotes a two-dimensional gradient operator; T denotes a time matrix formed by a combination of times of signals received by the plurality of discrete elements; C denotes a velocity matrix formed by the combination of velocities of the plurality of discrete elements.

In S24, the sound pressure values of the plurality of discrete elements in P may be calculated by calculating sound velocities of the ultrasonic wave propagating in each layer of medium material, and the sound velocities and set values of elements in B and T may be inputted into the fluctuation equation. In the fluctuation equation, a sound velocity value of each of the plurality of discrete elements is a corresponding weighting parameter of the sound pressure value of each of the plurality of discrete elements.

In S3, a loss function between the sound pressure value and a measured sound pressure value of the plurality of discrete elements may be established.

In some embodiments, a sound velocity value calculated by the equation (7) is input into the equation (8) and a loss function is defined in terms of a two-norm, and the loss function is expressed as follows:

$$E = \frac{1}{2} \Delta D^T \Delta D \qquad (9)$$

E denotes a matrix composed by the loss function; and $\Delta D$ denotes a pressure difference matrix composed by a sound pressure difference between the sound pressure value calculated by the fluctuation equation and the measured sound pressure value.

In some embodiments, the S3 may further include S31-S34 as follows.

In S31, the sound velocity value may be biased by the loss function.

An inverse problem is a process of minimizing the loss function. A biasing result by taking the partial derivative of the sound velocity in the equation (9) is as follows:

$$\frac{\partial E}{\partial C} = \left(\frac{\partial P}{\partial C}\right)^T W \Delta D \quad (10)$$

W denotes a weight matrix of ΔD for representing a relative contribution of residual data in an overall inversion unit.

$$\frac{\partial P}{\partial C}$$

may be referred to as a Jacobi matrix J.

In S32, the sound velocity value may be biased by the fluctuation equation.

In some embodiments, a biasing result by taking the partial derivative of the sound velocity for the left and right sides of the equation (8) is as follows:

$$\frac{\partial P}{\partial C} = A^{-1}\frac{\partial A}{\partial C}P \quad (11)$$

In S33, the biasing results of the S31 and the S32 may be combined to obtain an equation (12):

$$\frac{\partial E}{\partial C} = -P^T\left(\frac{\partial A}{\partial C}\right)^T A^{-1} W \Delta D \quad (12)$$

$A^{-1}W\Delta D$ denotes a reverse-propagating wave field. In some embodiments of the present disclosure, a direct calculation of the Jacobi matrix J can be avoided and a computational efficiency can be improved through the equation (11).

Therefore, in a framework of a minimum two norm, a velocity gradient of the loss function is calculated by following operations: 1. calculating a wave field of the array elements under a velocity model; 2. calculating a residual wave field under the velocity model by backpropagating a signal residual obtained from the array element as a new signal source.

In some embodiments, the optimal velocity value of the plurality of discrete elements is calculated by an optimal velocity iteration equation, and the optimal velocity iteration equation is as follows:

$$c_g^{m+1} = c_g^m - \alpha_g^m H_a^{-1}\frac{\partial E}{\partial c_g} \quad (13)$$

$c_g^{m+1}$ denotes a sound velocity value of a gth discrete element at m+1st iteration; $c_g^m$ denotes a sound velocity value of the gth discrete element at the mth iteration; $H_a$ denotes an approximate Hessian matrix; $\alpha_g^m$ denotes an iteration step size of the gth discrete element at the mth iteration; E denotes a matrix consisting of one or more loss functions; $c_g$ denotes a sound velocity value of the gth discrete element.

In S34, according to a principle of gradient descent, an iteration step size of the plurality of discrete elements may be set, the iteration step size may be substituted into the optimal velocity iteration equation, and the optimal sound velocity value may be obtained by iteration until the minimum value of the loss function is obtained.

In some embodiments, the iteration step size may include a first iteration step size and a second iteration step size, and the processor may determine the first iteration step size based on detecting features of the plurality of discrete elements; and determine the second iteration step size based on a sound velocity value and a pressure difference matrix of the plurality of discrete elements of the last iteration, a sound velocity value and a pressure difference matrix of the current iteration.

The first iteration step size is an initial iteration step size, i.e., an iteration step size corresponding to the first iteration.

The detecting features of the plurality of discrete elements are features associated with detecting the discrete elements. In some embodiments, the detecting features of the plurality of discrete elements may include a layer level, a sound pressure value, a measured sound pressure value of each of the plurality of discrete elements, and a time at which a signal is received by each of the plurality of discrete elements.

The layer level of each of the plurality of discrete elements is a layer level of a position of each of the plurality of discrete elements in the curved multi-layer medium stacked structure. For example, when a layer level of a discrete element is 2, the discrete element is in a second layer of the curved multi-layer medium stacked structure.

The time at which the signal is received by each of the plurality of discrete elements is a time at which the discrete element receives an ultrasonic wave. The processor may determine a time when the discrete element reflects the ultrasonic wave as the time at which the signal is received by the discrete elements. The sound pressure value of the discrete element is a sound pressure value of the discrete element calculated by the fluctuation equation. More descriptions of determining the sound pressure value of the discrete element and the measured sound pressure value of the discrete element may be found in the previous description.

In some embodiments, the processor may determine the first iteration step size based on the detecting features of the plurality of discrete elements in multiple ways. In some embodiments, the processor may determine the first iteration step size based on the detecting features of the plurality of discrete elements via a vector database.

The vector database is a database for determining the first iteration step size. In some embodiments, the vector database may include a feature vector consisting of historical detecting features of the discrete element in historical data and a label corresponding to the feature vector. The label corresponding to the feature vector is a historical first iteration step size corresponding to a best iteration in actual use in the historical data. The best iteration may be iteration with a least number of iterations and/or iteration with a smallest mean value of the sound pressure difference for each of the plurality of discrete elements in the pressure difference matrix obtained in the last iteration. The historical detecting features of the discrete element may include a historical layer, a historical sound pressure value, a historical measured sound pressure value of the discrete element, and a historical time at which the signal is received by the discrete element.

The feature vector is a vector constructed based on historical detecting features of each of the plurality of discrete elements. In some embodiments, the processor may construct the feature vector of the discrete element based on the historical detecting features of the plurality of discrete elements in the historical data.

For example, a feature vector p may be constructed based on a detecting feature (x, y, m, n) of the discrete element. The detecting feature (x, y, m, n) of the discrete element may indicate that the layer level of the discrete element is x, the sound pressure value is y, the measured sound pressure value is m, and the time at which the signal is received by the discrete element is n.

In some embodiments, the processor may calculate a vector distance between a target feature vector and each of the feature vectors, determine a similarity between the target feature vector and each of the feature vectors based on each of vector distances, determine a plurality of feature vectors that are greater than a similarity threshold in a first vector database, and take an average of the labels corresponding to the plurality of feature vectors as the first iteration step size of the target feature vector.

The vector distance may be a cosine distance, an Euclidean distance, or a Hamming distance, or the like. The target feature vector is a feature vector corresponding to a detecting feature to be matched by each of the plurality of discrete elements. The similarity threshold may be preset in advance.

The second iteration step size is an iteration step size determined after updating in one or more iterations. In some embodiments, the second iteration step size is updated during the iteration, and the second iteration step size takes the first iteration step size as an initial value.

In some embodiments, the processor may determine a second iteration step size for each of the plurality of discrete elements in a variety of ways based on a sound velocity value and a pressure difference matrix of the plurality of discrete elements of the last iteration and a sound velocity value and a pressure difference matrix of the current iteration. More description of the sound velocity value and the pressure difference matrix may be found in the preceding related description.

The following operations may be taken as an example.

The processor may calculate a difference between a mean value of pressure difference matrices obtained in the last iteration of the plurality of discrete elements and a mean value of pressure difference matrices obtained in the current iteration of the plurality of discrete elements, and use a ratio of the difference to the mean value of pressure difference matrices obtained in the last iteration of each of the plurality of discrete elements as a first adjustment ratio for each of the plurality of discrete elements, respectively. The mean value of the pressure difference matrices refers to a mean value of the pressure differences in the pressure difference matrices.

The processor may calculate an absolute value of a difference between a sound velocity value obtained in the last iteration of each of the plurality of discrete elements and a sound velocity value obtained in the current iteration of each of the plurality of discrete elements, and take a ratio of the absolute value to the sound velocity value obtained in the last iteration of each of the plurality of discrete elements as a second adjustment ratio of each of the plurality of discrete elements, respectively.

The processor may calculate a weighting sum of the first adjustment ratio and the second adjustment ratio of each of the plurality of discrete elements, and take the weighting sum as a target adjustment ratio for each of the plurality of discrete elements. A weighting coefficient may be set based on actual experience.

The processor may determine a second iteration step size adjustment of each of the plurality of discrete elements based on the target adjustment ratio of each of the plurality of discrete elements. The second iteration step size adjustment is an amount by which the second iteration step size needs to be increased or decreased for the current iteration relative to the last iteration. In some embodiments, the processor may determine the second iteration step size adjustment of each of the plurality of discrete elements based on the second iteration step size of the last iteration and the target adjustment ratio.

For example, the processor may determine the second iteration step size adjustment of each of the plurality of discrete elements by an equation: second iteration step size adjustment=second iteration step size of the last iteration× target adjustment ratio.

In some embodiments, the processor may determine a second iteration step size of each of the plurality of discrete elements based on the second iteration step size adjustment of each of the plurality of discrete elements.

In some embodiments, a frequency for updating the second iteration step size is related to the first complexity. More descriptions of the first complexity may be found in the preceding related description.

In some embodiments, the frequency for updating the second iteration step size of each of the plurality of discrete elements may be positively correlated to the first complexity of each of medium materials. The greater the first complexity of each of medium materials, the faster the frequency for updating the second iteration step size of each of the plurality of discrete elements. It may be understood that the greater the first complexity of each of medium materials, the more types of materials involved, the more complex a calculation process of the sound velocity is, the greater a possibility of parameter changes during the iteration, and the faster the frequency for updating the second iteration step size of each of the plurality of discrete elements, to accelerate convergence.

In the embodiments of the present disclosure, the frequency for updating the second iteration step size is determined based on the first complexity of the medium material, and frequencies for updating different second iteration step size may be determined based on the number of types of the medium material, respectively, which can ensure a more detailed examination in a complex region, and also accelerate the convergence of the iteration, and reduce an amount of data computation.

In the embodiments of the present disclosure, the first iteration step size of each of the plurality of discrete elements is determined by the vector database, which can quickly match results; based on a difference between results obtained in the last iteration and results obtained in the current iteration, the second iteration step size adjustment may be determined efficiently and flexibly.

In some embodiments, the processor may determine a next moving distance for the ultrasound emitter based on an emission time of the current detection of the ultrasound emitter, a last moving distance of the ultrasound emitter, and a second complexity of the medium material.

The emission time of the current detection is a time period from an emission of the ultrasonic wave to a reflection back in the current detection. For example, the emission time of the current detection is a1~a2, which means that the ultrasonic wave is emitted at time point a1 and reflected back at time point a2 in the current detection. In some embodiments, the processor may obtain the emission time of the current detection via a timer.

The last moving distance of the ultrasound emitter is a distance that the ultrasound emitter moved during the last detection. In some embodiments, the processor may obtain the last moving distance based on historical data.

The second complexity is a number of layers of the medium material at the current detection point. In some embodiments, the second complexity may be determined based on manual detection.

The next moving distance of the ultrasound emitter is a distance that the ultrasound emitter moves in the next detection. In some embodiments, the processor may determine the next moving distance of the ultrasound emitter in a variety of ways based on the emission time of the current detection of the ultrasound emitter, the last moving distance of the ultrasound emitter, and second complexities of a plurality of medium materials.

In some embodiments, the processor may determine the next moving distance of the ultrasound emitter by querying a preset table based on the emission time of the current detection of the ultrasound emitter, the last moving distance of the ultrasound emitter, and second complexities of the plurality of medium materials. The preset table may include the emission time of each historical probe in a plurality of historical probes, historical second complexities of the plurality of medium materials, and a correspondence between a historical last moving distance and a historical next moving distance of each historical probe. The preset table may be constructed based on historical data.

In some embodiments, the processor may take a mean value of actual moving distances of the ultrasound emitter corresponding to multiple probes with the best detecting effect in the plurality of historical probes as the next moving distance of the ultrasound emitter. In some embodiments, the probes with the best detecting effect may be a detection with the least number of iterations. The probes with the best detecting effect may also be a detection with a minimum average value of a sound pressure difference of each of the plurality of discrete elements in the pressure difference matrix obtained in the last iteration.

In some embodiments, the processor may generate a displacement instruction based on the next moving distance of the ultrasound emitter, the displacement instruction may be used to instruct the ultrasound emitter to move based on the next moving distance. The displacement instruction is an instruction related to instructing the ultrasound emitter to move.

In embodiments of the present disclosure, by determining the probes with the best detecting effect in historical probes of the ultrasound emitter, the next moving distance of the ultrasound emitter may be determined automatically based on the actual moving distances of the probes, which helps the ultrasound emitter to achieve a better detecting effect in the next detection.

In S4, a gradient descent calculation may be performed on the sound pressure value based on the loss function, a sound velocity value may be obtained by iteratively updating until a minimum value of the loss function is obtained. The sound velocity value is used as a weighting parameter in the plurality of discrete elements, and the sound velocity value is an optimal speed value.

Figure 3:
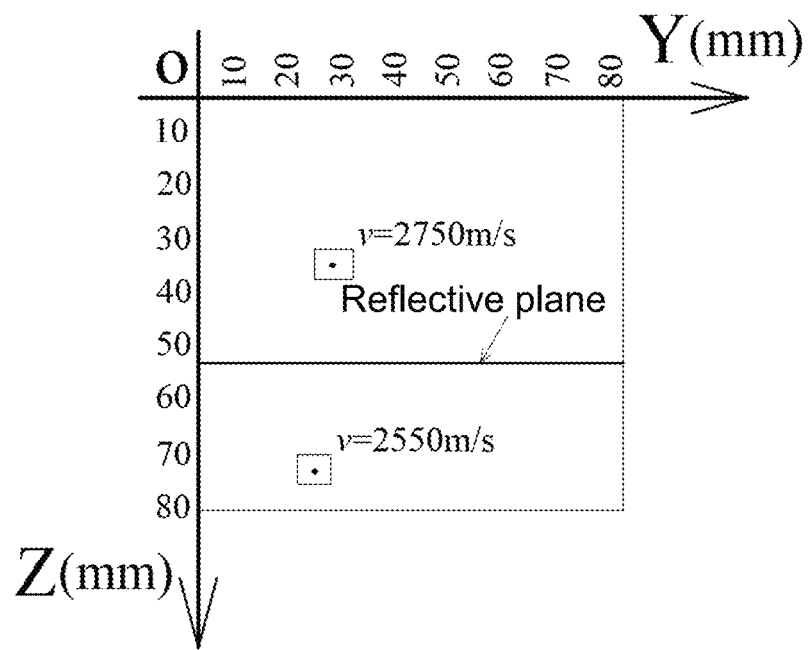
FIG. 3 is a schematic diagram illustrating a planar multi-layer medium stacked structure according to some embodiments of the present disclosure.

As shown in FIG. 3, a planar multi-layer medium stacked structure is composed of two types of medium materials. O is a coordinate origin and coincides with a corner of a top surface of the planar multi-layer medium stacked structure; the Y-axis direction is a width direction of the planar multi-layer medium stacked structure, and the Z-axis direction is a thickness direction of the planar multi-layer medium stacked structure.

Figure 4:
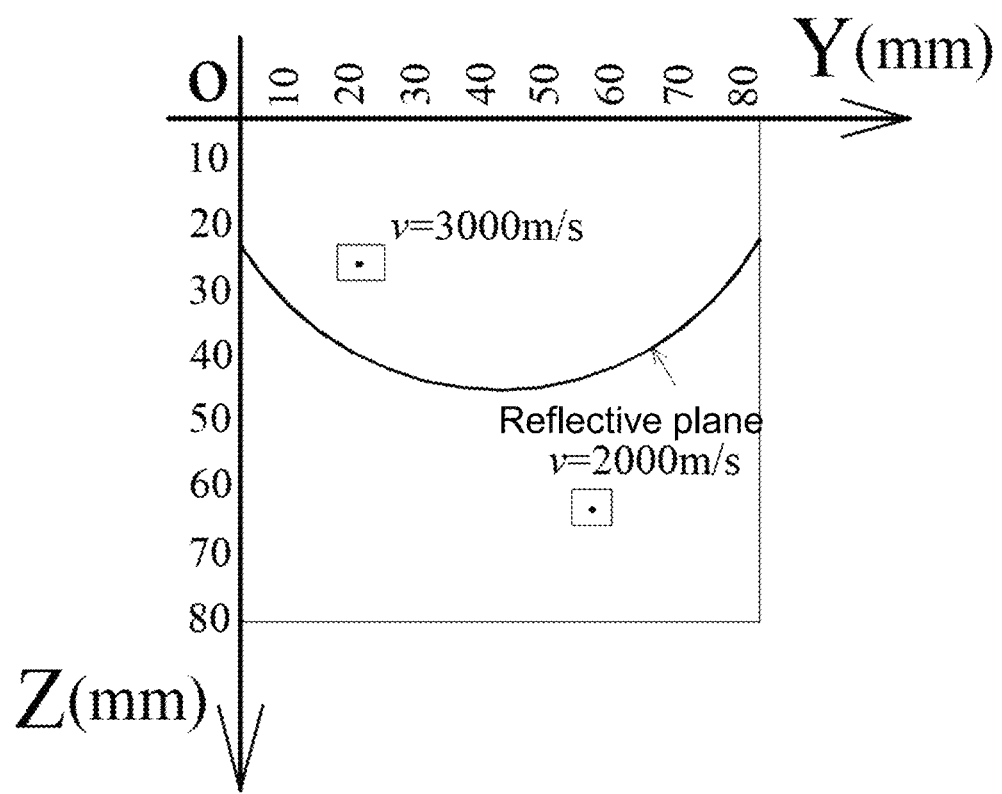
FIG. 4 is a schematic diagram illustrating a curved multi-layer medium stacked structure according to some embodiments of the present disclosure.

As shown in FIG. 4, a curved multi-layer medium stacked structure is composed of the two types of medium materials constituting the planar multi-layer medium stacked structure, a curved reflective plane is approximated as a concave parabola. O is a coordinate origin and coincides with a corner of a top surface of the curved multi-layer medium stacked structure; the Y-axis direction is a width direction of the curved multi-layer medium stacked structure, and the Z-axis direction is a thickness direction of the curved multi-layer medium stacked structure.

A number of array elements of the ultrasound emitter is 16, a probe frequency is 100 Khz; a sampling frequency is 10 Mhz; in the present disclosure, a sound velocity of an upper medium material in the planar multi-layer medium stacked structure is 2750 m/s, and a sound velocity of a lower medium material is 2550 m/s. In the curved multi-layer medium stacked structure, a sound velocity of an upper medium material is 3000 m/s, and a sound velocity of a lower medium material is 2000 m/s.

In some embodiments of the present disclosure, the whole process of sound velocity calibration is divided into two steps: first, the material is assumed to be a planar multi-layer medium stacked structure, and a preliminary calibration of the sound velocity is performed by combining an ultrasonic pulse bottom echo process and a collected full matrix; second, a velocity model obtained from the preliminary calibration is placed as an initial model into an iterative process of a full-wave inversion and through continuous iteration, the velocity model reaches a final state of convergence, realizing a boundary refinement calibration of a sound velocity of a multi-layer variable thickness material. The ultrasonic pulse bottom echo process is simpler to process the data and faster in arithmetic, but the calibration accuracy of the process for non-planar structures is not high; the full-wave inversion may obtain a final velocity field by utilizing rich information contained in the whole pulse echo, which is more accurate, but a convergence rate is very slow. Combining the two processes not only accelerates the convergence speed of the model, but also prevents the full-wave inversion iteration from dispersing due to a large gap between an initial model and an actual velocity field.

The basic concepts have been described above, and it is apparent to those skilled in the art that the foregoing detailed disclosure serves only as an example and does not constitute a limitation of the present disclosure. While not expressly stated herein, various modifications, improvements, and amendments may be made to the present disclosure by those skilled in the art. Those types of modifications, improvements, and amendments are suggested in the present disclosure, so those types of modifications, improvements, and amendments are still within the spirit and scope of the exemplary embodiments of the present disclosure.

Also, the disclosure uses specific words to describe embodiments of the disclosure. Such as "an embodiment," and/or "some embodiment" means a feature, structure, or characteristic associated with at least one embodiment of the present disclosure. Accordingly, it should be emphasized and noted that "an embodiment" or "an alternative embodiment" referred to two or more times in different places in the present disclosure do not necessarily refer to a same embodiment. In addition, certain features, structures, or characteristics of one or more embodiments of the present disclosure may be suitably combined.

In addition, unless expressly stated in the claims, the order of processing elements and sequences, the use of numerical letters, or the use of other names described herein are not intended to limit the order of the processes and laminar flow hoods of the present disclosure. While some embodiments of the invention currently considered useful are discussed in the above disclosure by way of various examples, it should be understood that such details serve only illustrative purposes and that the additional claims are not limited to the disclosed embodiments, but rather the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the present disclosure, and thereby aid in the understanding of one or more embodiments of the invention, the preceding description of embodiments of the present disclosure sometimes incorporates a variety of features into a single embodiment, accompanying drawings, or description thereof. However, this method of disclosure does not imply that more features are required for the objects of the present disclosure than are mentioned in the claims. Rather, claimed subject matter may lie in less than all features of a single foregoing disclosed embodiment.

Some embodiments use numbers to describe the number of components and attributes, and it should be understood that such numbers used in the description of the embodiments are modified in some examples by the modifiers "about," "approximately," or "generally" is used in some examples. Unless otherwise noted, the terms "about," "approximate," or "approximately" indicates that a ±20% variation in the stated number is allowed. Correspondingly, in some embodiments, the numerical parameters used in the disclosure and claims are approximations, which can change depending on the desired characteristics of individual embodiments. In some embodiments, the numerical parameters should take into account the specified number of valid digits and employ general place-keeping. Although the numerical domains and parameters used to confirm the breadth of their ranges in some embodiments of the present disclosure are approximations, in specific embodiments such values are set as precisely as possible within the feasible range.

With respect to each patent, patent application, patent application disclosure, and other material, such as articles, books, manuals, publications, documents, etc., cited in the present disclosure, the entire contents thereof are hereby incorporated by reference. Application history documents that are inconsistent with or conflict with the contents of the present disclosure are excluded, as are documents (currently or hereafter appended to this specification) that limit the broadest scope of the claims of the present disclosure. It should be noted that in the event of any inconsistency or conflict between the descriptions, definitions, and/or use of terminology in the materials appended to the present disclosure and those described in the present disclosure, the descriptions, definitions, and/or use of terminology in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for calibrating a sound velocity applied to a multi-layer variable thickness structure, comprising:
    S1, constructing a planar multi-layer medium stacked structure and determining a sound velocity of each layer of medium material in the planar multi-layer medium stacked structure;
    S2, establishing a curved multi-layer medium stacked structure, the curved multi-layer medium stacked structure being arranged with a plurality of discrete elements; establishing a fluctuation equation for determining a sound pressure value of each of the plurality of discrete elements;
    S3, establishing a loss function between the sound pressure value and a measured sound pressure value of the plurality of discrete elements; and
    S4, performing a gradient descent calculation on the sound pressure value based on the loss function, iteratively updating to obtain a sound velocity value until a minimum value of the loss function is obtained, wherein the sound velocity value is as a weighting parameter in the plurality of discrete elements, and the sound velocity value is an optimal speed value;
    wherein S1 further includes:
    S11, constructing the planar multi-layer medium stacked structure, selecting n types of medium materials, the medium materials being arranged in stacked layers sequentially from top to bottom along a vertical direction, and a contact surface between two adjacent layers of medium materials constituting a horizontal reflective plane;
    S12, irradiating the planar multi-layer medium stacked structure by using an ultrasound emitter with array elements arranged sequentially and equidistantly along a straight line, the irradiation process including:
    S121, selecting a planar multilayer medium stacked structure in a cuboid shape, establishing a space rectangular coordinate system O-XYZ by designating a thickness direction of the planar multi-layer medium stacked structure, i.e., a direction in which the plurality of medium materials are arranged in stacked layers sequentially from the top to bottom along the vertical direction, as a positive direction of a Z-axis, designating a width direction of the planar multi-layer medium stacked structure as a positive direction of a Y-axis, and designating a length direction of the planar multi-layer medium stacked structure as a positive direction of an X-axis; wherein a top surface of the planar multi-layer medium stacked structure coincides with an XY surface, and a corner of the top surface coincides with a coordinate origin O;
    S122, arranging the array elements on the ultrasound emitter sequentially and equidistantly along a straight line; moving the ultrasound emitter along a positive direction of the Y-axis to vertically irradiate the reflective plane and form a moving trajectory, and an arrangement direction of the array elements being parallel to the positive direction of the X-axis during the movement of the ultrasound emitter;
    S123, repeatedly moving the ultrasound emitter along the positive direction of the Y-axis multiple times to form a moving trajectory corresponding to each of a plurality of lanes, the plurality of lanes being parallel to each other along the position direction of the Y-axis, and a distance between adjacent moving trajectories being equal to a distance between adjacent array elements;

wherein a sound velocity of an ultrasonic wave emitted by the ultrasound emitter propagation in a kth layer of medium material is $c_k$, and a thickness of the kth layer of medium material is $d_k$, and based on the sound velocity of the ultrasonic wave and the thickness of medium material, a corresponding time is calculated based on a time calculation equation, the time calculation equation is:

$$t_{i,j,k}^2 = \frac{(x_{i,r} - x_{j,r})^2}{\tilde{c}_k^2} + t_{i,i,k}^2$$

wherein $t_{i,j,k}$ denotes a time taken for the ultrasonic wave emitted by an ith array element to propagate to the kth layer of medium material and to be received by a jth array element after being reflected in a reflective plane of the kth layer of medium material; $t_{i,j,k}$ denotes a time taken for the ultrasonic wave emitted by the ith array element to propagate to the kth layer of medium material and to be received by the ith array element after being reflected in the reflective plane of the kth layer of medium material; $\tilde{c}_k$ denotes a root-mean-square of a sound velocity from a first layer of medium material to the kth layer of medium material; $x_{i,r}$ denotes a positional coordinate of the ith array element in a rth moving trajectory on the X-axis; $x_{j,r}$ denotes a positional coordinate of the jth array element in the rth moving trajectory on the X-axis;

S13, calculating $\tilde{c}_n$ based on $\tilde{c}_k$ with the following equation:

$$\tilde{c}_n = \sqrt{\frac{\sum_{k=1}^{n} c_k^2 t_k}{\sum_{k=1}^{n} t_k}};$$

$$t_k = \frac{t_{i,i,k} - t_{i,i,k-1}}{2};$$

$$\sum_{k=1}^{n} c_k^2 t_k = \tilde{c}_n^2 \sum_{k=1}^{n} t_k;$$

wherein $t_k$ denotes a single-trip time of vertical propagation of the ultrasound wave in the kth layer of medium material; $c_n$ denotes a root-mean-square of a sound velocity from the first layer of medium material to an nth layer of the medium material; $t_{i,j,k-1}$ denotes a time taken for the ultrasonic wave emitted by the ith array element to propagate to a k−1th layer of medium material and to be received by the ith array element after being reflected in the reflective plane of the kth layer of medium material;

S14, a n−1th layer of medium material satisfying a following equation:

$$\sum_{k=1}^{n-1} c_k^2 t_k = \widetilde{c_{n-1}}^2 \sum_{k=1}^{n-1} t_k$$

wherein $\widetilde{c_{n-1}}$ denotes a root-mean-square of a sound velocity from the first layer of medium material to the n−1th layer of medium material; and S15, obtaining a sound velocity expression equation of $c_n$ by the equation in S13 and the equation in S14, wherein the sound velocity expression equation is:

$$c_n^2 = \frac{\tilde{c}_n^2 t_{i,i,n} - \widetilde{c_{n-1}}^2 t_{i,i,n-1}}{t_{i,i,k} - t_{i,i,k-1}}$$

wherein $t_{i,i,n-1}$ denotes a time used for the ultrasonic wave emitted by the ith array element to propagate to the n−1th layer of medium material and to be received by the ith array element after being reflected in a reflective plane of the n−1th layer of medium material; $t_{i,i,n}$ denotes a time used for the ultrasonic wave emitted by the ith array element to propagate to a nth layer of medium material and to be received by the ith array element after being reflected in a reflective plane of the nth layer of the medium material;

wherein values of $\tilde{c}_n$, $t_{i,i,n}$, $\widetilde{c_{n-1}}$, $t_{i,i,n-1}$, $t_{i,i,k}$, and $t_{i,i,k-1}$ are measured by corresponding measuring instruments, and by substituting the values into the specific expression equation of $c_n$, a sound velocity of the ultrasonic wave propagating in the medium material is obtained.

2. The method of claim 1, wherein an optimal velocity value of the plurality of discrete elements is calculated by an optimal velocity iteration equation, and the optimal speed iteration equation is:

$$c_g^{m+1} = c_g^m - \alpha_g^m H_a^{-1} \frac{\partial E}{\partial c_g}$$

wherein $c_g^{m+1}$ denotes a sound velocity value of a gth discrete element at m+1th iteration; $c_g^m$ denotes a sound velocity value of the gth discrete element at mth iteration; $H_a$ denotes an approximate Hessian matrix; $\alpha_g^m$ denotes an iteration step size of the gth discrete element at the mth iteration; E denotes a matrix consisting of one or more loss functions; $c_g$ denotes a sound velocity value of the gth discrete element.

3. The method of claim 1, wherein determining the sound pressure value of the plurality of discrete elements by using the fluctuation equation includes:

S21, constructing the curved multi-layer medium stacked structure, selecting the n types of medium materials, the medium materials being arranged in stacked layers sequentially from top to bottom along the vertical direction, and the contact surface between two adjacent layers of medium materials constituting a curved reflective plane;

S22, irradiating the curved multi-layer medium stacked structure using the ultrasound emitter according to S121-S123; wherein the array elements, during the movement along the Y-axis, form irradiation vertical planes that are equidistant, parallel, and vertically arranged along the X-axis direction, and the irradiation vertical planes intersect with the curved reflective plane;

S23, during the movement of the ultrasound emitter, taking points in a moving path at a preset interval of time, wherein vertical irradiation rays are formed by each point in the irradiation vertical plane intersect with the curved reflective plane to form intersection points; a combination of the intersection points separates the corresponding irradiation vertical surface into a plurality of grids, the intersection points constitute grid points of the grids, the grid points constitute the plurality of discrete elements;

the fluctuation equation is expressed as follows:

$$A \cdot P = B;$$
$$A = \frac{1}{C^2}\frac{\partial P^2}{\partial T^2} - \nabla^2;$$

wherein A denotes an operator of the fluctuation equation; P denotes a sound pressure field matrix formed by a combination of the sound pressure values of the plurality of discrete elements; B denotes a matrix of laser emitting sources; $\nabla^2$ denotes a two-dimensional gradient operator; T denotes a time matrix formed by a combination of times of signals received by the plurality of discrete elements; C denotes a velocity matrix formed by the combination of velocities of the plurality of discrete elements; and S24, calculating the sound pressure values of the plurality of discrete elements in P by calculating sound velocities of the ultrasonic wave propagating in each layer of medium material and inputting the sound velocities and set values of elements in B and T into the fluctuation equation; wherein in the fluctuation equation, a sound velocity value of each of the plurality of discrete elements is a corresponding weighting parameter of the sound pressure value of each of the plurality of discrete elements.

4. The method of claim 3, wherein the loss function includes:

$$E = \frac{1}{2}\Delta D^T \Delta D;$$

wherein E denotes a matrix composed by the loss function; and $\Delta D$ denotes a pressure difference matrix composed by a sound pressure difference between the sound pressure value calculated by the fluctuation equation and the measured sound pressure value.

5. The method of claim 4, wherein the S3 includes:

S31, biasing the sound velocity value by the loss function, a biasing result is as follows:

$$\frac{\partial E}{\partial C} = \left(\frac{\partial P}{\partial C}\right)^T W \Delta D$$

wherein W denotes a weight matrix of $\Delta D$;

S32, biasing the sound velocity value by the fluctuation equation, a biasing result is as follows:

$$\frac{\partial P}{\partial C} = A^{-1}\frac{\partial A}{\partial C}P$$

S33, combining the biasing results of the S31 and step S32, a result is as follows:

$$\frac{\partial E}{\partial C} = -P^T \left(\frac{\partial A}{\partial C}\right)^T A^{-1} W \Delta D$$

wherein $A^{-1}W\Delta D$ denotes a reverse-propagating wave field; and

S34, according to a principle of gradient descent, setting an iteration step size of the plurality of discrete elements and substituting the iteration step size into the optimal velocity iteration equation, and obtaining the optimal sound velocity value by iteration until the minimum value of the loss function is obtained.

* * * * *